March 17, 1964   E. R. STRAIGHT ETAL   3,124,851
WINDLACE STRUCTURE
Filed July 18, 1960

INVENTORS.
EDWARD R. STRAIGHT
JAMES R. DAVIDSON
BY Frank E. Robbins
ATTORNEY

United States Patent Office 3,124,851
Patented Mar. 17, 1964

3,124,851
WINDLACE STRUCTURE
Edward R. Straight, Fairport, and James R. Davidson, Rochester, N.Y., assignors to Vogt Manufacturing Corp., Rochester, N.Y.
Filed July 18, 1960, Ser. No. 43,649
13 Claims. (Cl. 20—69)

The present invention relates to weatherstripping and to methods of making it. More particularly, the invention relates to windlace structures that are adapted for use in automobile bodies as decorative trim strips that exclude drafts; and to methods of making such structures.

Windlaces for the automobile industry are usually designed to seat on metallic flanges. To facilitate installation, they are generally U-shaped and are sufficiently resilient so that their arms can grip the flanges frictionally. In some cases, sharply pointed members been built into windlaces to function like barbs and to resist removal, once installed.

Since windlaces frequently must be mounted on flanges that are curved, the windlaces must be flexible enough to permit mounting about curves. Ordinarily, the flanges are curved substantially in a single plane, but sometimes three dimensional curvatures are encountered. The flexibility requirement is therefore three-dimensional.

At the same time, some rigidity is required to facilitate handling and installation, and to enhance product appearance; and the arms of a windlace must be sufficiently stiff or rigid either to grip the flange frictionally upon installation, or at least to seat snugly along the flange surfaces if the arms do not serve a retainer function.

The requisite rigidity and resilience have been obtained, in some cases, through the incorporation in a windlace structure of a ribbon of sheet metal haivng sufficient thickness to be self-sustaining, yet having sufficient resilience to permit the insertion of the supporting flange between its free arms. However, such a structure often lacks the degree of articulation that is desirable for ease of mounting, and almost invariably the use of some separate means is required for holding the windlace in place, once installed. Very often, the requirement for the use of such retainer means entails a greater manufacturing expense because of the assembly steps that are required, and often is responsible for a considerable amount of noise when the windlace is installed in a location where it is subjected to vibration.

In recent years, cushioned windlace has been made by inserting cushioning material between the decorative fabric cover and the metal ribbon. Usually, the fabric cover is fastened to the U-shaped metal ribbon at the free ends of its arms, by a mechanical fastening device, with the cushion held in place between the cover and the metal ribbon under slight compression. From the structural standpoint, such a windlace leaves much to be desired, because the fabric cover is under constant tension, therefore is more susceptible to wear. Moreover, such cushioned windlace is not symmetrical and tends to be bulky. For that reason it may be more difficult to handle and install, and frequently its manufacture requires a considerable amount of labor and a specialized fabricating technique.

One object of the present invention is to provide a new, practical windlace structure that is relatively light in weight, that has a minimum number of parts, that is simple and relatively inexpensive to manufacture so that it is competitive in cost, and that is highly articulated so that it can conform readily to a curved supporting member. A related object of the invention is to provide a practical process for manufacturing such a windlace structure.

Another object of the invention is to provide a new, practical cushioned windlace structure that is compact, easy to handle, sturdy, and simple to manufacture. A related object of the invention is to provide a practical process for making such a windlace structure.

Another object of the invention is to provide a cushioned windlace structure that has a minimum number of parts and that is easy to fabricate.

Another object of the invention is to provide a cushioned windlace that is compact and that is highly resilient, flexible, and articulated, and that has exceptional strength.

Still another and more general object of the invention is to provide an improved weatherstrip that is well adapted for use by the automobile industry as a windlace, but that is also susceptible of other uses as a trim member, for example, or as a rubbing strip or finishing strip, and that is characterized by a unitary structure that is easy to manufacture, easy to install, and that is highly resistant to wear. A related object of the invention is to provide a weatherstrip of the character just described that is highly articulated so that it can conform to the shape of a curved flange, that can exert a strong frictional grip on a supporting flange, and that is very quiet even when subjected to severe vibration.

Other objects of the invention will be apparent to those skilled in this art from the specification and from the recital of the appended claims.

In a preferred embodiment of this invention, the windlace structure comprises an elongate assembly of generally U-shaped cross-section, for mounting along the edge of a supporting base such as a metal flange. The assembly is sufficiently rigid to retain its desired U-shaped cross-section, but it has sufficient resilience so that its arms can clamp securely on a supporting base.

It has a skeletal stiffening member that is formed from a single wire that is looped back and forth to form a plurality of spaced reaches that extend transversely of the length of the stiffening member. This stiffening member is embedded in a plastic body that is disposed in a layer on one surface of a web of a decorative fabric cover. The plastic body is in face-to-face contact with the cover and is bonded to the interior surface of the cover continuously over their contiguous surfaces.

The web of decorative covering fabric has a width that is greater than the width of the stiffening member and of the plastic layer in which the stiffening member is encapsulated. The web is formed with a pair of longitudinally-extending welts. The lateral marginal portions of the web, including the welts, are folded over the plastic material and are bonded thereto. The loops of the wire stiffening member preferably are disposed substantially at the lateral edges, respectively, of the plastic layer, and the plastic layer extends from one free edge of the U-shaped windlace to the other. The welts of the covering fabric are disposed on the interior surfaces of the arms of the windlace, to engage and to grip the supporting base.

This preferred windlace structure has a unitary construction since the plastic layer and covering fabric are bonded together and are substantially inseparable, and the wire stiffening member is embedded in the plastic layer. It is light but strong. It is easily handled and easily fabricated. In use it tends to be very quiet even when subjected to severe vibration. It grips the supporting base uniformly and continuously. It is inexpensive to produce and is easily bent to conform to the curved contours of a supporting base.

In another preferred but modified embodiment of the invention, the plastic layer is a foam, and is produced by using a foamable latex for the plastic layer. In manufacturing the article, the latex is foamed and set simultaneously, in situ. The windlace is compact, well cushioned, and highly flexible.

Figure 1:
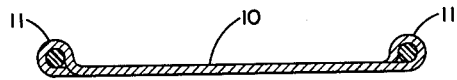
FIGURE 1 is a cross-section of a lace web that can be used in making a windlace structure in accordance with one embodiment of the invention, and that has a flexible woven fabric web portion and a pair of longitudinally-extending welts at its lateral edges.

The windlace structures of this invention can be and have been made advantageously and economically by a continuous, highly efficient fabrication process, and could be fabricated in a number of different ways. We shall describe one way that has been employed for making windlace structures in accordance with a preferred embodiment of this invention, for the purpose of demonstrating the invention.

Referring now to the drawing by numerals of reference, 10 denotes a web of woven fabric that was selected for its wearing qualities, appearance, and flexibility. The web 10 was formed with a pair of welts 11 at its lateral edges respectively. Each welt 11 was formed by securing an elongate rod 12 of resilient, flexible plastic material to the woven fabric portion of the web 10 by threads 14 that were passed around the rod at longitudinally spaced locations thereon.

In the process of making a windlace in accordance with a preferred embodiment of the invention, a layer 16 of a fusible thermoplastic adhesive material was applied over a central portion of the web 10. As the tape 10 was unwound and coated with the fused adhesive layer 16, a metallic wire 17 was fed continuously through a special forming machine that produced alternating loops by winding the wire first in one direction then in the other, across a predetermined path, to produce an elongate skeletal stiffening member 18 having spaced reaches disposed transversely of its length, and having a width substantially equivalent to the width of the desired windlace. To facilitate subsequent working of the stiffening member, a tape 20 was lightly adhered to one surface of the stiffening member 18. The tape 20 had a width slightly less than the width of the stiffening member.

Figure 6:
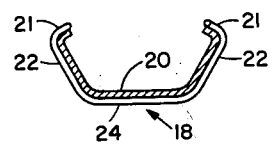
FIGURE 6 is a similar section thereof showing this assembly partially formed into the desired U-shape.
Figure 7:
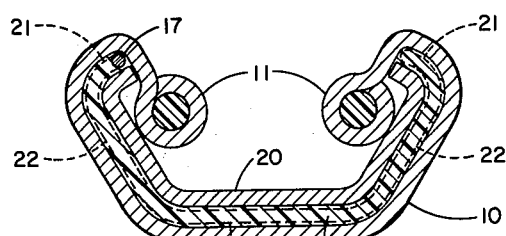
FIGURE 7 is a cross-section, on an enlarged scale, of this shaped assembly with the adhesive-coated web applied thereto and with the wire stiffening member embedded in the fused, adhesive, plastic material, the position of the wire member being indicated by dashed lines.

The assembly of the looped wire 18 and its adhered tape 20 was then bent first to form inturned lips 21 along the lateral edges of the assembly, then to form arms 22 at each side of a central section 24, as shown in FIGURE 6.

Figure 8:
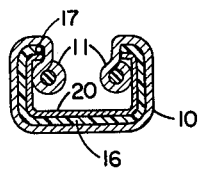
FIGURE 8 is another sectional view thereof showing the assembly of FIG. 7 bent to the final U-shape.

The adhesive-coated web, with the adhesive layer 16 still in fused condition, was then applied to the partially-formed stiffening member-fabric assembly, with sufficient pressure to embed the stiffening member within the fused thermoplastic layer 16. The lateral marginal portions of the lace 10 were folded over the embedded edges of the arms 22 and over the embedded lips 21, so that the welts 11 were disposed in a confronting relation to each other, on the interior surfaces of the arms of the assembly. The entire assembly was then mechanically formed to the final U-shape as shown in FIG. 8.

The final mechanical forming step was completed while the thermoplastic material remained soft. However, the final mechanical forming step can be completed after the thermoplastic material has hardened if it is sufficiently flexible.

In the finished windlace, the interior fabric 20 and the exterior covering fabric 10 were disposed respectively in face-to-face contact with the plastic layer 16, and were bonded to the hardened plastic layer 16 substantially continuously over their respective contiguous faces, by plastic itself.

The windlace was proportioned so that the distance between the confronting welts 11 was somewhat smaller than the width of the supporting base upon which the windlace was to be mounted, so that when mounted on the supporting base, the welts and the fabric-covered gripping jaws exerted a continuous clamping action that secured the windlace on the supporting base.

This windlace was flexible and readily bendable to follow curved portions of supporting bases on which it was mounted, such as, for example, the curve on the door-opening flange of an automobile. With curves as normally encountered in the automobile industry, this windlace can be bent without any substantial distortion of its cross-sectional shape and without substantial wrinkling of the fabric cover. It can be produced in different dimensions as desired and can be adjusted at any intervals of length desired to grip door-opening flanges, or other supporting base members, of different thicknesses. While it has particular advantages for applications in the automobile field, it is well suited for other application such as in household appliances, to provide a rubbing strip or protective covering for flanged edges.

The windlace just described, and its method of production, represent preferred embodiments of the invention. Many departures from the techniques and materials described are possible within the scope and contemplation of the present invention. For example, a variety of covering materials can be selected for the web 10, to permit a wide choice of patterns, colors and finishes for decorative and styling purposes in harmonizing with automobile interiors, for example. Thus, the web 10 can be formed from a fabric that is woven from fibers of cotton, rayon, plastic material such as polyethylene, or from a mixture of cotton and plastic yarns.

Figure 2:
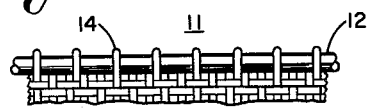
FIGURE 2 is a fragmentary plan view of the lace, on an enlarged scale, showing a preferred form of welt.
Figure 3:
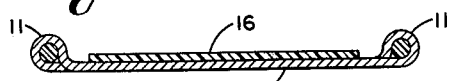
FIGURE 3 is a cross-section of the lace with a layer of a fused, adhesive, thermoplastic material applied thereto.

Those skilled in this art will recognize that many other modifications may be made of the structure illustrated that are within the scope of this invention. By way of further example, while I prefer that the web 10 be formed from a tough, flexible woven fabric having welts in the form of flexible resilient plastic rods that are secured to the fabric at longitudinally-spaced locations by threads that are passed around the rods respectively, as illustrated in FIG. 2, because this is a very flexible structure, other covering materials can be employed successfully. One covering material that is inexpensive and highly desirable for many applications has been formed by the continuous extrusion of a thermoplastic material having rod-like welts extruded integrally with the film portion of the web.

Alternatively, where either a fabric or a film is employed as the material for the cover 10, the welts may simply be marginal portions that are folded over upon themselves; or they may comprise cords, strings, or flexible plastic rods that are secured to the web portion of the cover in any convenient manner. It is preferred that the confronting portions of the windlace that engage the supporting member be covered by fabric or film, however, to insure that the installed windlace will not be a source of noise if subjected to vibration.

Similarly, while the plastic layer 16 preferably is formed from a polyolefin or polyvinyl plastic, other thermoplastic or even thermosetting materials can be employed. Representative and preferred thermoplastic materials that have been employed successfully include the line of flexible hot cements that are sold under the registered trademark "Thermogrip" by B. B. Chemical Company. These materials are usually sold in rod form and are dry, 100% thermoplastic adhesives. They are translucent, waxy in appearance, and comprise low molecular weight polyethylenes. The selection of a suitable plastic material will depend upon the particular properties desired in the windlace, the nature of the covering material, and other similar factors. Many of the epoxy resin, cellulose derivative, modified rubber, synthetic rubber, and other plastic materials, that can be formed into a fluid layer and then hardened, and that have the requisite flexibility, adhesion, and strength, after hardening, can be used successfully.

In some cases, where an unusually strong bond is desired between the plastic layer and the wire stiffening member, the wire can be precoated with a material that has some affinity for the metallic wire and that has a greater affinity for the resin than does the wire.

While we prefer to bend over the ends of the wire stiffening member to form the lips 21 illustrated in FIG. 6, these lips are not essential to a good gripping action. The frictional engagement of the windlace with the supporting base, and the resilience of the structures that can be produced in accordance with this invention, in many cases obviate the need for such gripping jaws.

The inner fabric web or liner 20 can be omitted entirely if desired. However, its use enhances the appearance of the windlace and facilitates the forming operations. For optimum appearance even after wear, it is preferred that the colors of the cover 10, plastic body 16, and liner 20 be carfully matched.

A cushioned, somewhat more flexible windlace structure was made, in accordance with another preferred embodiment of the invention, by using a fluid, foamable plastic material instead of a fused, thermoplastic, adhesive material. This embodiment of the invention is illustrated in FIGURES 9 through 12.

Figure 9:
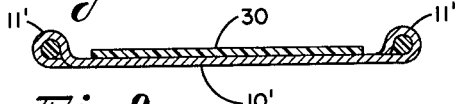
FIGURE 9 is a cross-section of a lace that has a layer of a foamable latex applied thereto, for use in making a cushioned windlace structure in accordance with another embodiment of this invention.

Referring now by numerals of reference to FIGURE 9, 10' denotes a web of covering material that was formed with a pair of welts 11' along its lateral edges. A layer 30 of a foamable latex was deposited on a central portion of the web 10'. The latex 30 was thick and creamy, and flowed under pressure.

Figure 10:
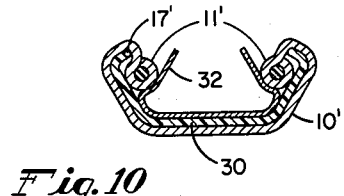
FIGURE 10 is a cross-section thereof with the coated lace applied about a partially bent skeletal stiffening member that is embedded in the latex and with a release sheet inserted within the partially-formed U-shape to cover the exposed surface of the latex.
Figure 11:
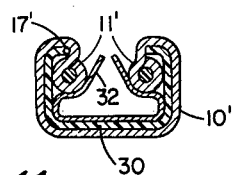
FIGURE 11 is a cross-sectional view thereof in which the assembly is bent to the desired U-shape.
Figure 12:
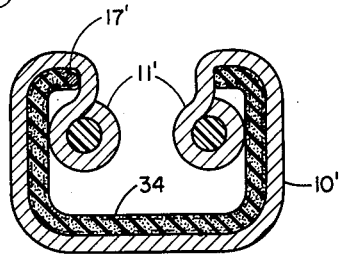
FIGURE 12 is a cross-section showing the cushioned windlace after the latex has been foamed and cured, and the release sheet has been removed, and showing the position of the stiffening member by dashed lines.

The process of making the cushioned windlace was generally similar to the process illustrated in FIGURES 1 through 8, except that in forming the wire to the partially bent stage, no liner fabric was used. The wire stiffening member was embedded in the latex layer 30 and the welts 11' were folded over onto the interior surfaces of the partial assembly, respectively, as shown in FIG. 10. A release sheet 32, of polyethylene film, was then inserted into the partial assembly, supported on a forming mandrel or the like (not shown), to engage the latex layer 30 and to hold it in place during subsequent operations. This partial assembly was then bent to the desired U-shaped cross-section as shown in FIGURE 11, while confining the latex layer between the cover 10' and the release sheet 32, and holding the release sheet 32 in position by a forming mandrel. The forming mandrel or other support, for the release sheet 32, may be, for example, a preformed sponge rubber member, an inflatable, shaped structure, a piece of board, or the like. It must be capable of being withdrawn from the windlace after the latex has been foamed and cured.

The assembly was then passed through a steam chamber, simultaneously to foam and to cure the latex 30. The release sheet 32 was then removed, to leave the finished structure illustrated in FIGURE 12, in which the layer of latex 30 had been converted to a layer 34 of foamed elastomeric material having a high degree of flexibility and resilience. The foamed layer 34 completely surrounded the skeletal wire stiffening member.

While we prefer to use a synthetic rubber foamable latex, of the butadiene-styrene type, foamable latices of polyvinyl, polyurethane, and other resinous materials, that cure to form flexible foams, can be employed.

The cushioned windlace can be modified in many ways as can the first-described embodiment of the invention. The cushioned windlace structure is highly flexible. The resilient nature of the flexible foam facilitates bending the cushioned windlace structure around a curve, because the foam tends to equalize any applied stress, so that the cushioned windlace is high conformable and is quite easy to handle and flex.

Figure 4:
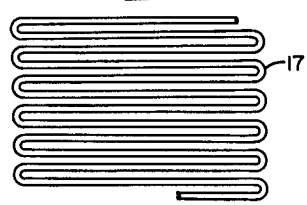
FIGURE 4 is a plan view of a stiffening member that is formed from a looped wire in accordance with a preferred embodiment of this invention.
Figure 5:
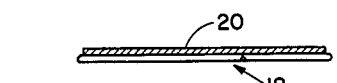
FIGURE 5 is a cross-section showing the wire stiffening member with a fabric web adhered to its upper surface.

While a formed wire skeletal stiffening member is inexpensive and requires only simple manufacturing techniques, other skeletal or filamentary stiffening members can be employed. For example, instead of a looped wire, a preformed, resin-impregnated cord of glass fibers, string, or the like, preshaped to have a generally U-shaped cross-section, and formed from either a thermosetting resin, or from a thermoplastic resin having as high or preferably a higher melting point than the encapsulating resin, can be used. Such a skeletal stiffening member can have the same looped shape as is shown in FIG. 4, or alternatively, could comprise a continuous, elongate, longitudinally-flexible spine having integral ribs projecting from its sides at longitudinally spaced locations; in such cases, however, being formed with the desired cross-section.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:

1. A windlace structure having longitudinal formability and transverse resilience, and comprising an elongate assembly of generally U-shaped cross-section for mounting on a supporting member with its arms embracing and resiliently gripping said member, comprising an elongate, unitary body of generally U-shaped cross-section that is formed from a flexible synthetic plastic material, an elongate, longitudinally formable, transversely resilient skeletal stiffening member embedded in said body and substantially conforming in cross-section and lengthwise extent to said body, and a web of a flexible covering material disposed over the exterior surface of said body in face-to-face contact therewith and bonded thereto over their contiguous faces, said web having a pair of longitudinally-extended welts disposed at its lateral edges, the lateral marginal portions of said web being folded over the edges of said body and bonded thereto, and said welts being disposed in confronting relation to each other adjacent to the respective edges of said body and between lateral marginal portions of said stiffening member, for engagement against opposite surfaces of said supporting member respectively.

2. A windlace structure having longitudinal formability and transverse resilience, and comprising an elongate assembly of generally U-shaped cross-section for mounting on a supporting member with its arms embracing and resiliently gripping said member, comprising an elongate unitary body of generally U-shaped cross-section that is formed from a flexible synthetic plastic material, an elongate, longitudinally formable, transversely resilient skeletal stiffening member that is formed from metallic wire and that is embedded in said body and that substantially conforms to said body in cross-section and in lengthwise extent, and a web of flexible covering material disposed over the exterior surface of said body in face-to-face contact therewith and bonded thereto over their contiguous faces, said web having a pair of longitudinally-extending welts disposed at its lateral edges, the lateral marginal portions of said web being folded over the edges of said body and bonded thereto, and said welts being disposed in confronting relation to each other adjacent the respective edges of said body and between lateral marginal portions of said stiffening member, for engagement against opposite surfaces of said supporting member respectively.

3. A windlace structure in accordance with claim 2 wherein each of said welts is formed from a resilient, flexible rod of a plastic material.

4. A windlace structure in accordance with claim 2 wherein said covering material is a woven fabric and each of said welts is formed from a resilient, flexible rod of a plastic material, and each rod is secured to the fabric by threads that extend from the fabric around the rod at locations that are longitudinally spaced from each other relative to said rod.

5. A windlace structure in accordance with claim 2 wherein said covering material is a plastic film and said welts are flexible, resilient plastic rods that are integral with said film.

6. A windlace structure in accordance with claim 2 wherein a strip of a flexible covering material is disposed over the interior surface of said body in face-to-face contact therewith and bonded thereto over their contiguous faces.

7. A windlace structure having longitudinal formability and transverse resilience, and comprising an elongate assembly of generally U-shaped cross-section for mounting on a supporting member with its arms embracing and resiliently gripping said member, comprising an elongate, unitary body of generally U-shaped cross-section that is formed from a flexible thermoplastic material, an elongate, longitudinally formable, transversely resilient skeletal stiffening member embedded in said body and substantially conforming in cross-section and lengthwise extent to said body, said stiffening member being formed from a single stiff metallic wire that is looped back and forth to provide spaced reaches that extend transversely of the length of said body and loops that are disposed substantially at the respective edges of said body, and a web of a flexible covering material disposed over the exterior surface of said body in face-to-face contact therewith and bonded thereto substantially continuously over their contiguous surfaces, said web having a pair of longitudinally-extending welts that are disposed at its lateral edges, the lateral marginal portions of said web being folded over the lateral edges of said body respectively, and bonded thereto, and said welts being disposed in confronting relation to each other adjacent the respective edges of said body respectively and on its interior surface and between lateral marginal portions of said stiffening member, for engagement against opposite surfaces of said supporting member respectively.

8. A windlace structure having longitudinal formability and transverse resilience, and comprising an elongate assembly of generally U-shaped cross-section for mounting along the margin of a supporting member with its arms embracing and resiliently gripping said member, comprising an elongate, flexible, unitary body of generally U-shaped cross-section that is hardened from a fused thermoplastic material, an elongate, longitudinally formable, transversely resilient skeletal stiffening member embedded in said body and substantially conforming in a cross-section and lengthwise extent to said body, and that is formed from a stiff metallic wire that is looped back and forth to provide spaced reaches that extend transversely of the length of said body and loops that are disposed substantially at the respective edges of said body, and a web of a flexible woven fabric disposed over the exterior surface of said body in face-to-face contact therewith and bonded thereto substantially continuously over their contiguous faces, said web having a pair of longitudinally-extending welts disposed at its lateral edges respectively, each of said welts comprising a continuous, resilient flexible rod of plastic material that is secured to said web at longitudinally spaced locations thereon, the lateral marginal portions of said web being folded over the respective edges of said body and bonded thereto, and said welts being disposed in confronting relation to each other adjacent the respective edges of said body respectively and on its interior surface and between lateral marginal portions of said stiffening member, for engagement against opposite surfaces of said supporting member respectively.

9. A windlace structure having longitudinal formability and transverse resilience, and comprising an elongate assembly of generally U-shaped cross-section for mounting along the margin of a supporting member with its arms embracing and resiliently gripping said member, comprising an elongate, flexible unitary body of generally U-shaped cross-section that is hardened from a fused thermoplastic material, an elongate, longitudinally formable, transversely resilient skeletal stiffening member embedded in said body and substantially conforming in cross-section and lengthwise extent to said body, said stiffening member being formed from a stiff metallic wire that is looped back and forth to provide spaced reaches that extend transversely the length of said body and loops that are disposed substantially at the respective edges of said body, and a web disposed over the exterior surface of said body and bonded thereto in face-to-face contact therewith substantially continuously over their contiguous surfaces, said web comprising a flexible plastic film that is formed with a pair of integral, longitudinally-extending welts that are disposed at its lateral edges respectively, the lateral marginal portions of said web being folded over the edges of said body and bonded thereto, and said welts being disposed in confronting relation to each other adjacent the edges of said body on its interior surface and between lateral marginal portions of said stiffening member, for engagement against opposite surfaces of said supporting member respectively.

10. A windlace structure having longitudinal formability and transverse resilience, and comprising an elongate assembly of generally U-shaped cross-section for mounting along the margin of a supporting member with its arms embracing and resiliently gripping said member, comprising an elongate, flexible unitary body that is hardened from a fused thermoplastic material and that has a generally U-shaped cross-section, an elongate, longitudinally formable, transversely resilient skeletal stiffening member embedded in said body and substantially conforming in cross-section and lengthwise extent to said body, said stiffening member being formed from a stiff metallic wire that is looped back and forth to provide spaced reaches that extend transversely of the length of said body, and loops that are disposed substantially at the respective edges of said body, the arms of said assembly, and the portions of said stiffening member embedded therein, having lateral marginal portions adjacent their respective free ends that are turned toward each other to provide resilient gripping jaws, and a web of a flexible covering material disposed over the exterior surface of said body in contact therewith and bonded thereto substantially continuously over their contiguous surfaces, said web having a pair of longitudinally-extending welts that are disposed at its lateral edges respectively, the lateral marginal portions of said web being folded over the edges of said body and bonded thereto and extending over said gripping jaws, said welts being disposed in confronting relation to each other adjacent said jaws and interiorly thereof on the interior surface of said assembly, and said welts projecting toward each other beyond said jaws for engagement against opposite surfaces of said supporting member respectively.

11. A windlace structure having longitudinal formability and transverse resilience, and comprising an elongate assembly of generally U-shaped cross-section for mounting along the margin of a supporting member with its arms embracing and resiliently gripping said member, comprising an elongate, unitary body of generally U-shaped cross-section that is formed from a porous, flexible expanded synthetic plastic material, an elongate, longitudinally formable, transversely resilient skeletal stiffening member embedded in said body and substantially conforming in cross-section and lengthwise extent to said body, and a web of a flexible covering material disposed in face-to-face contact with the exterior surface of said body and bonded thereto substantially continuously over their contiguous surfaces, the lateral marginal portions of said web being folded over the edges of said body and bonded to the interior surface of said body and being disposed in confronting relation to each other adjacent the edges of said body respectively and between lateral marginal portions of said stiffening member for engagement against opposite surfaces of said supporting member respectively.

12. A windlace structure having longitudinal formability and transverse resilience, and comprising an elongate assembly of generally U-shaped cross-section for mounting along the margin of a supporting member with its arms embracing and resiliently gripping said member, comprising an elongate unitary body of generally U-shaped cross-section that is formed from a flexible foamed plastic material, an elongate, longitudinally formable, transversely resilient skeletal stiffening member embedded in said body and substantially conforming in cross-section and lengthwise extent to said body, and that is formed from a stiff metallic wire that is looped back and forth to provide spaced reaches that extend transversely of the length of said body and loops that are disposed substantially at the respective edges of said body, and a web of a flexible covering material disposed over the exterior surface of said body in face-to-face contact therewith and bonded thereto substantially continuously over their contiguous surfaces, the lateral marginal portions of said web being folded over the edges of said body and bonded thereto and being disposed in confronting relation to each other adjacent the edges of said body respectively for engagement against opposite surfaces of said supporting member respectively.

13. A windlace structure in accordance with claim 12 wherein said web is a flexible woven fabric and is formed at its lateral edges with welts that are disposed in said assembly in confronting relation to each other adjacent the edges of said body respectively and between lateral marginal portions of said stiffening member, for engagement against opposite surfaces of said supporting member respectively.

References Cited in the file of this patent

UNITED STATES PATENTS

| | | | |
|---|---|---|---|
| 371,129 | Dyer | Oct. 4, | 1887 |
| 1,702,270 | Randall | Feb. 19, | 1929 |
| 1,772,912 | Randall | Aug. 12, | 1930 |
| 1,818,227 | Livensparger | Aug. 11, | 1931 |
| 1,934,256 | Bronson | Nov. 7, | 1933 |
| 2,204,630 | Spraragen | June 18, | 1940 |
| 2,219,382 | Conlon | Oct. 29, | 1940 |
| 2,378,888 | Clark | June 19, | 1945 |
| 2,549,581 | Dodge | Apr. 17, | 1951 |
| 2,746,103 | Bright | May 22, | 1956 |